Figure 1:
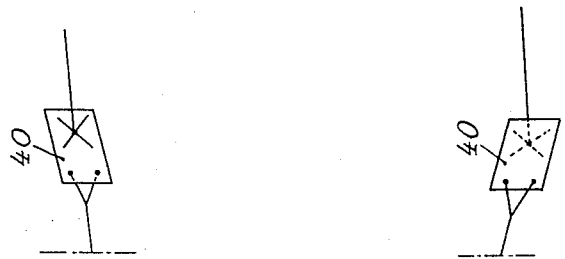
Figure 1:
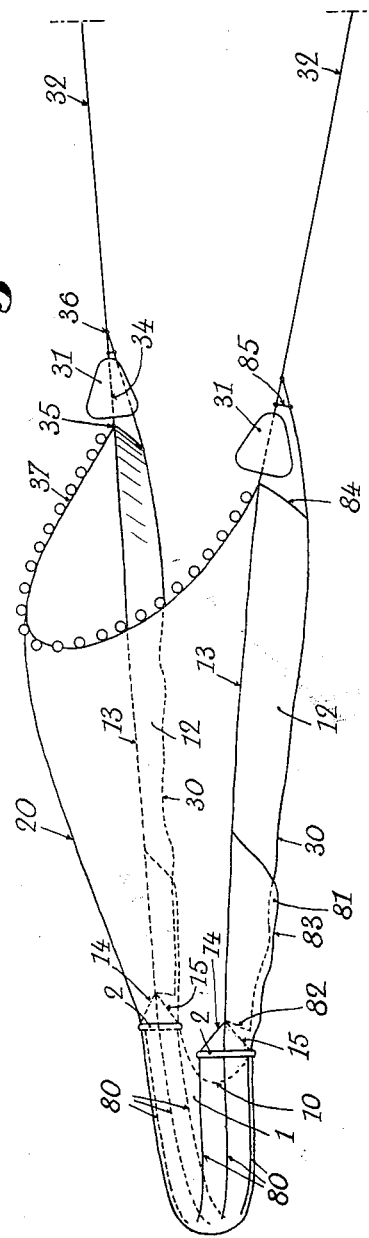

Jan. 16, 1934.  O. DAHL  1,943,372
FREE GROUND ROPE TRAWL GEAR
Filed March 29, 1932  2 Sheets-Sheet 1

INVENTOR:
OSCAR DAHL
BY Ruege & Boyce
ATTORNEYS

Jan. 16, 1934.  O. DAHL  1,943,372
FREE GROUND ROPE TRAWL GEAR
Filed March 29, 1932  2 Sheets-Sheet 2
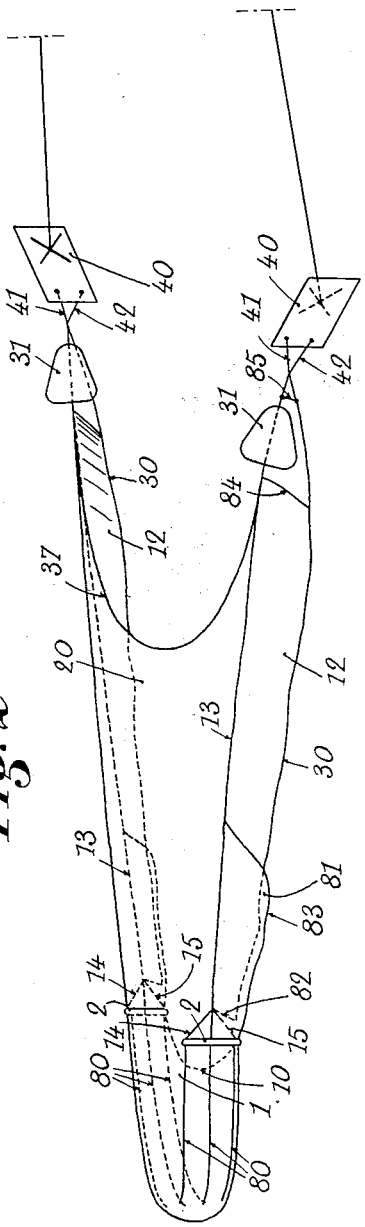
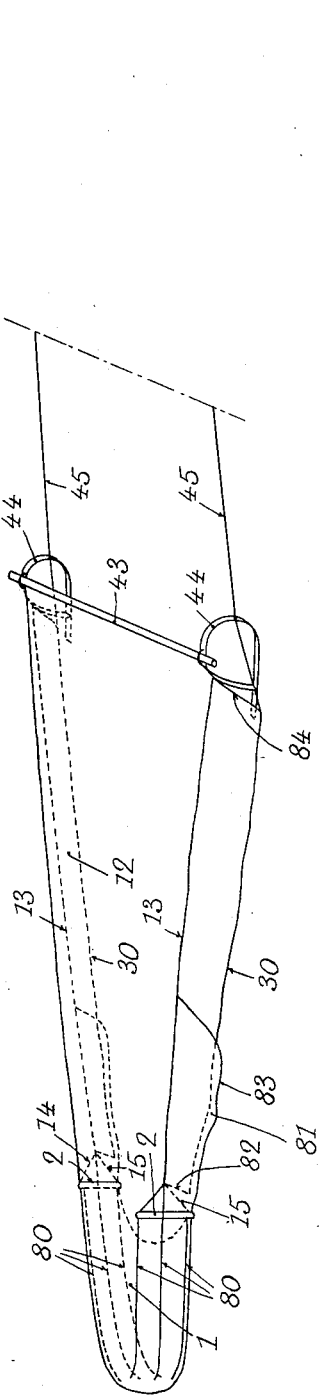
INVENTOR:
OSCAR DAHL
BY: Ruger + Boyce
ATTORNEYS Patented Jan. 16, 1934

1,943,372

UNITED STATES PATENT OFFICE 1,943,372

FREE GROUND-ROPE TRAWL GEAR

Oscar Dahl, La Rochelle, France, assignor to V. D. Limited, London, England

Application March 29, 1932, Serial No. 601,760, and in France May 6, 1931

5 Claims. (Cl. 43—9)

The invention relates to free ground-rope trawl gears, as described in the Vigneron application Serial No. 543,840 filed June 12, 1931 now Patent No. 1,867,196 of July 12, 1932.

Experiments which have been made for improving such fishing gears which are deprived of a belly, have put in evidence certain difficulties; one of the most serious difficulties is to constantly maintain the rear pocket or cod end in contact with the sea-bottom, in order to prevent the escape of the fish at the rear end of the weighted bands of net fabric which are bordered at the bottom part by the free ground-rope.

It has been experienced that, when fishing with such free ground-rope gears, the rear pocket has a tendency to rise from the ground, and this appears to be due, at least partially, to the fact that the reaction of the water upon the covering sheet is no longer counterbalanced, as in the usual gears, by the reaction exercised by the water upon the belly of the net.

Attempts have been made to remedy this defect by heavily weighting the free ground-rope, as well as the small ground-rope of the rear pocket, and the lower end of the rigid support devices which are located at the opening of the rear pocket, but the weight of the ballast which had to be thus attached to these parts was so great that it became very difficult to employ such fishing apparatus.

It has been found, however, that the rear pocket of the net can be held in contact with the ground without requiring the use of any special ballast, provided the cables used for the direct traction of the rear pocket, and to which the upper or covering sheet and the weighted bands of net fabric are attached, are considerably shortened. This is apparently due to the fact that the shortening of the traction cables permits the meshes of the covering sheet to open to their full extent, thus facilitating the outflow of the water, and hence reducing the upward reaction of the water upon the net. At all events, the results thus obtained are quite satisfactory.

It should be noted that such traction cables should not be confounded with the "side" or "selvedge" ropes or cables provided in the ordinary nets which possess a belly and a usual ground-rope, stretched across the direction of trawl, since the side or selvedge ropes or cables did not operate like the traction cables of the fishing gear according to the invention; on the one hand, the usual nets had no tendency to rise off the ground, as above stated, and on the other hand, it was impossible with such nets, in contradistinction with the opinion of some inventors, to shorten the side or selvedge ropes to such an extent as to entirely relieve the meshes of the net from all traction. In the conventional nets, in fact, the side or selvedge ropes are merely adapted to limit the tearing of the net or to confine the tearing to certain places, and the side ropes have exactly the same length as the part of the net to which they are sewed, this length being measured when the net is dry and is stretched to the maximum, in which case the meshes are entirely closed.

When the net is then moistened, all its cords or ropes become shortened, and the side ropes, which are of larger diameter, will shorten somewhat more than the net itself; but this shortening is not sufficient during fishing to stretch the side ropes, which curve out laterally along with the swelling net. It has been experienced that, when an attempt is made to greatly reduce the length of the side ropes, in order to actually stretch them and thus to more completely open the meshes, as sought by some inventors, the ground rope is now no longer stretched, and the belly shows folds or wrinkles, and catches upon obstacles, and the net will practically cease to capture the fish.

On the contrary, in the free foot-rope gear, owing to the absence of the belly and the stretched ground-rope, the relative length of the traction cables can be reduced without drawback, and this permits of holding the rear pocket upon the ground. Thus, applicant has experienced a net of 35 metres length, between the opening of the rear pocket and the ends of the wings, measured in the dry net, with the meshes entirely closed. By giving a length of 32 metres to the rear pocket traction cables, the rear pocket could not be held against the ground, unless applying a ballast of 300 kgs. With traction cables of 28 metres length the rear pocket commenced to graze lightly on the ground without any special weighting. With traction cables of 26.80 metres, which represents a shortening of nearly 25 per cent, the rear pocket bore constantly on the ground, as shown by signs of wear upon the metal pieces attached to the lower ropes and the like for testing purposes.

It is obviously impossible to establish an accurate formula for the general proportion between the length of the traction cables and the length of the corresponding part of the net, but the above-mentioned results show the effect of this factor upon the stability of the net, thus enabling a person skilled in the art to readily find by a rapid test, in each particular case, the optimum length for which all weighting can be eliminated.

It will be observed that, since it now becomes feasible, in the apparatus with free ground-rope, to considerably shorten the traction cables and to thus open the meshes of the covering sheet to a great degree, the immature fish are allowed to escape, thus avoiding the destruction of the fishing resources, which are much reduced at the present time.

Another difficulty encountered in the operation of the fishing gear with free ground-rope, was to maintain the head-rope and the traction cables of the rear-pocket at a sufficient distance above the sea-bottom, in order to prevent them from catching upon obstacles. In practice, the usual spreading slats fail to answer this purpose, in a quite satisfactory manner, as they are quite unstable in this new type of fishing gear: While the top end of the slat is drawn inwardly by the head-rope, which is well stretched, the lower end is no longer drawn inwardly, as in the usual fishing gear in which the ground rope is tightly stretched across the direction of trawl, and hence the slats incline inwardly and turn down flatwise, thus reducing the opening of the net, and bringing the head-rope and the traction cables of the rear pocket in contact with the ground. Such cables are then liable to catch upon obstacles, and to cause a rapid deterioration of the net.

According to the present invention, this drawback is obviated by attaching the head-rope and the traction-cables of the rear pocket to the rear end of a supporting device having a tapered or similar form, which is perfectly stable and will easily clear and ride over obstacles. By the use of such devices, the head-rope and the traction cables of the rear-pocket are constantly maintained at a given distance above ground, this distance being predetermined according to the outline and nature of the sea-bottom.

Further improvements, and chiefly those made in the arrangement of the suspended curtain sheets of net fabric, will be more clearly understood with reference to the following description and accompanying drawings, which show various nets embodying the invention.

Fig. 1 illustrating a bulging net,
Fig. 2 an ottertrawl net, and,
Fig. 3 a beam and irons trawl.

In the trawl gear shown in Fig. 1, the net comprises a rear pocket 1 whose small belly is bounded at the front by a small ground-rope 10, and whose sides are attached to rods or other rigid members 2. The top of this rear pocket is formed by an extension of the upper or covering sheet 20 of the net, and is attached to traction cables 13, which are secured to rods 2 by crow-foot connections 14, 15. The cables 13 are attached at the front end to devices 31, having a tapered or like shape, which are connected with the shearboards 40 by dragging cables 32. Bands of net fabric 12 are suspended from the cables 13 and form curtains, being bordered at the bottom by weighted slack cables or so-called "free groundropes" 30, the curtains having a sufficient height to allow the said ground-ropes to closely follow the outline of the sea-bottom at all times.

As above set forth, the cables 13 are much shorter than the length of the edge of the upper sheet 20, between the rods 2 and the front corners of the said sheet, when the net is stretched to the maximum extent in this direction. When this length is 35 metres, it has been found that the rear pocket will remain in contact with the ground without any special weighting, and without any prejudicial distortion of the net by giving 26.80 metres length to the traction cables. The above-mentioned data is obviously given solely by way of example, and the best proportion is to be determined in each particular case, according to the dimensions of the net and of its meshes, the nature and the cross-section of the traction cables, the weighting, the normal rate of towing, and the like.

Another important feature of the invention, as above set forth, consists in the use, as attaching and supporting means for the traction cables 13, at the end of each net wing, a device 31 having a circular or polygonal cross-section, of such nature that when the said device rests upon a horizontal plane, its axis will be inclined and its small end be near this horizontal plane.

Figs. 1 and 2 show a constructional form of this device, which has the shape of a solid or hollow cone 31; a rigid rod 34, having at each end 35—36 an eye or a ring extends through said cone, along its axis. To the ring 36 is attached the towing cable 32 of the net, and to the ring 35 the traction cable 13 of the rear pocket. The front end of the hanging curtain 12 may also be attached at the same point 35, as well as the end of the head-rope 37 of the net. The front end of the hanging curtain 12 and the end of the head-rope 37 may also be attached at any other point of the traction cable 13.

Obviously, the attaching points on the tapered device 31 at 35—36 are preferably provided with swivels in order to prevent entangling of the ropes.

The conical support 31 may be replaced by any member having an equivalent geometrical shape and serving the same purpose, that is:

1°.—holding the end of the traction cable 13 above the ground,
2°.—possessing a perfect stability for preventing the head-rope from catching upon obstacles on the ground,
3°.—maintaining the towing hawser 32 as close as possible to the ground; and
4°.—readily clearing the obstacles.

It will be seen that no rear head-rope is provided to connect the upper ends of the rods 2 together. Experience has shown that although a head-rope of this kind facilitates the opening of the meshes of the upper sheet 20, the meshes of the rear pocket will remain closed, and its presence leads to the formation of an upper pocket in the upper sheet 20, in front of the rear pocket; the afflux of water into this upper pocket tends to raise the rear pocket off the ground.

According to one feature of this invention, this rear head-rope is replaced by a connection between the bottom, middle and top of each rod 2 with suitable traction ropes 80, which are sewed to the sides of the rear pocket and whose length is such that, when they are stretched, the meshes of the net remain fully open, all the traction being imparted by the ropes 80 to the rods 2.

As these latter are drawn directly by the cables 13 through the medium of the crow-foot connections 14—15, the traction is finally imparted to these cables 13, which almost entirely relieves the meshes of the covering sheet 20 and allows them to be always well opened, so that the immature fish are allowed to escape.

In order to prevent the formation of side pockets in the curtains 12, in front of the rods 2, by reason of the afflux of water, and to leave the cables 30 entirely free and slack, the rear edges of the curtains are detached from the rods 2, and, to prevent the fish from escaping, the spaces thus left between the rods 2 and the rear edges of the curtains 12 are filled up by small additional curtains, mounted at the end of the main curtain.

As observed in the drawings, the free rear edge 82 of the curtain 12 is situated somewhat in front of the rod 2, and for instance at the apex of the crow-foot 14 or 15, and the additional curtain 81 is suspended from the cable 13, and outside the curtain 12. Its rear edge is attached to the rod 2. This curtain extends forwardly in such manner as to overlap the curtain 12 by several metres.

The afflux of water into the net bulges out the curtain 12, and the water tends to flow between the edge 82 of the curtain 12 and the rod 2, but this passage is well closed off by the curtain 81, against which the curtain 12 is applied by the pressure of the water.

As the rear ends of the cables 30 are detached and loose, and the cables 83 of the additional curtain are slack, they have no tendency to collect rubbish into the rear pocket.

The tapered metallic devices 31, which are attached to the ropes 13 at one end and to the cables 32 at the other end, have proved most effective in maintaining the ropes 13 and the head-rope 37 above the ground, also in applying the cables 32 upon the ground to the maximum of their length (to avoid the escape of flat fish), and in readily riding over obstacles without becoming embedded in soft ground. As concerns the arrangement of the tapered devices 31, good results have been obtained by mounting along the front edge of the curtain 12, a rope 84 which is attached to the cable 13, whilst the cable 30, attached to the cable 32 in front of the device 31, is held away from this latter (in order that it shall not hinder its movements) by a small crosspiece 85, situated in front of the support device 31, in such manner that the said device will rotate freely.

Such tapered devices are usually from 0.70 to 1 metre in diameter. As concerns the rods 2, their height depends upon the average height of the obstacles on the ground. With rods of 1 metre length, the cables 13 operate at about 0.50 metres above ground, and with 2 metres rods they operate at 1 metre above ground at the rear, coming somewhat nearer the ground at the front, thus having an inclined position. In this case, the curtains 12 will obviously have a corresponding trapezoidal shape.

The net as hereinbefore described possesses important advantages, because the benefit obtained by dispensing with the belly (which reduces risk of damage and prevents rubbish from collecting in the rear pocket) is no longer counterbalanced by the drawback due to an unstable condition of the net, which hitherto could not be entirely obviated; in other words, the parts which are to run upon the ground now fulfil their functions in an approved manner; this has been ascertained by examining the lower ends of the rods 2, the small ground-rope 10, the cables 30, 83 and 82, and the tapered supporting devices 31, all of which exhibited traces of wear upon their whole length, whilst the parts which operate above ground especially the ropes 13 and the head-rope 37 did not show any sign of wear.

It is evident that the improvements hereinbefore set forth will apply to all nets deprived of belly and having a free ground rope, because in all cases where the belly is eliminated, the rear pocket tends to rise off the ground, and pockets tend to be formed in the weighted net bands 12.

Thus the invention applies equally well to the ottertrawl gear shown in Fig. 2, in which the shear-boards 40 are located quite close to the net wings. The same reference numerals denote parts corresponding to those described with reference to Fig. 1, and a detail description of such parts appears superfluous.

However, the elimination of the belly, and the slack arrangement of the ground rope, in the ottertrawl gear, sets up a special difficulty. In the known ottertrawl gear, the shear-boards 40 are directly attached to the ends of the wings, and the upper and lower rear corners are drawn backwards and inwardly to about the same extent by the head-rope and the ground-rope, respectively, thus assuring the vertical stability of these shear-boards. If an attempt is made to locate such boards at the ends of the wings of a net provided with a free ground rope, the lower rear corners of the boards are no longer drawn backwards and inwardly, and in practice it is found that they turn down flatwise inwardly, and the net fails to capture the fish.

According to a feature of this invention, this drawback is obviated by inserting between the shear boards 40 and the ends of the net wings suitable tapered or similar support devices 31, which are attached to the cables 13 and 30 in the same manner as in the trawling gear shown in Fig. 1, but which are connected directly with the shear-boards 40 by crow foot connections 41—42.

The embodiment of the invention with a beam and irons trawl is shown in Fig. 3, in which 43 is the usual beam, 44 the iron straps, and 45 the crow foot used for the towing.

The invention can in like manner be applied to the Danish senne or to the boeuf net, towed by two boats (with the use of tapered supporting devices at the ends of the wings), and to other fishing gears.

Having now described my invention what I claim as new and desire to secure by Letters Patent is:

1. In a fishing gear, a rear pocket, traction cables for said rear pocket, weighted loose bands suspended from said traction cables, a covering sheet whose edges are attached to said traction cables, substantially conical members attached at their rear bases to said traction cables, and towing means attached to the front apex of said conical members, respectively.

2. In a fishing gear, a rear pocket, traction cables for said rear pocket, weighted loose bands suspended from said traction cables, a covering sheet whose edges are attached to said traction cables, members having a generally tapering shape and a substantially circular cross-section attached to said traction cables, towing means attached to the smaller end of said members, free ground ropes attached to the lower edges of said loose bands, respectively, and whose front ends are attached to said towing means adjacent the smaller ends of said tapering members, and spacing members between said ground ropes and said towing means, respectively.

3. In a fishing gear as claimed in claim 2, ropes attached to the front ends of said loose bands, respectively, and connecting said ground ropes with said traction cables, behind said tapering members, respectively.

4. In a fishing gear, a rear pocket, traction cables for said rear pocket, weighted loose bands suspended from said traction cables, a covering sheet whose edges are attached to said traction cables, members having a substantially circular cross-section attached at the rear side to said traction cables, and towing means including a pair of shear boards, respectively arranged close to said members and attached to the front side thereof.

5. In a fishing gear, a rear pocket, two upright members at the entrance of said rear pocket, traction cables for said rear pocket attached to an intermediate point of said upright members, weighted loose bands suspended from said traction cables, respectively, a covering sheet attached to said traction cables, and additional loose weighted bands suspended from said traction cables and overlapping the rear ends of said first-mentioned loose weighted bands, outwardly of the latter with respect to the net, the rear vertical edges of said first mentioned bands being detached from said upright members, and the rear vertical edges of said additional bands being attached to said upright members.

OSCAR DAHL.